United States Patent
Brock (10) Patent No.: US 10,242,240 B1
(45) Date of Patent: Mar. 26, 2019

(54) DECODED IMAGING ENGINE USING STANDARD UN-DECODED ENGINE INTERFACE

(71) Applicant: SYMBOL TECHNOLOGIES, LLC, Lincolnshire, IL (US)

(72) Inventor: Christopher W. Brock, Manorville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/856,379

(22) Filed: Dec. 28, 2017

(51) Int. Cl.
*G06K 7/10* (2006.01)
*G06K 9/22* (2006.01)
*G06K 7/14* (2006.01)

(52) U.S. Cl.
CPC ....... *G06K 7/1456* (2013.01); *G06K 7/10722* (2013.01); *G06K 7/146* (2013.01); *G06K 9/228* (2013.01)

(58) Field of Classification Search
USPC ................ 235/462.45, 470–472.03
See application file for complete search history.

(56) References Cited

U.S. PATENT DOCUMENTS

| | | | | |
|---|---|---|---|---|
| 7,268,924 | B2* | 9/2007 | Hussey | G06K 7/10722 358/446 |
| 9,286,502 | B1* | 3/2016 | Ashby | G06K 7/1465 |
| 9,665,760 | B1* | 5/2017 | Lei | G06K 7/1478 |
| 2006/0283952 | A1* | 12/2006 | Wang | G06K 7/10722 235/462.01 |
| 2010/0147952 | A1* | 6/2010 | Carlson | G06K 7/10722 235/462.41 |
| 2010/0187315 | A1* | 7/2010 | Goren | G06K 7/14 235/462.42 |

* cited by examiner

*Primary Examiner* — Tuyen K Vo
(74) *Attorney, Agent, or Firm* — Yuri Astvatsaturov (57) ABSTRACT

An imaging reader captures and analyzes image data, including raw captured image data, and analyzes that capture image data to decode indicia contained therein. The indicia may be one or more two-dimensional barcodes. A dedicated front-end controller of the imaging reader generates decode data for the indicia and combines the decode data with the image data using a combinational protocol, after which a resulting decode enhanced image data frame is communicated to a host processor for processing.

13 Claims, 7 Drawing Sheets

DECODED IMAGING ENGINE USING STANDARD UN-DECODED ENGINE INTERFACE

BACKGROUND OF THE INVENTION

Solid-state imaging readers have been used, in both handheld and hands-free modes, to capture images of targets such as packages bearing encoded indicia. Example encoded indicia include one-dimensional and two-dimensional barcodes, as well as other indicia such as QR codes, that are used to identify packages, products, and goods, particularly through a Universal Product Code (UPC) symbol.

Conventionally, imaging readers included light sources and image sensors that capture images of the target and transmit the captured images to a central processing unit (CPU) for image analysis, processing, and display. In more recent imaging readers, preliminary image processing is performed on the captured image data before the captured image data is sent to the CPU. Indeed, in some recent imaging readers, capture data indicating various system data, such as control settings, image exposure time, imager gain, focal length, illumination time, and illumination intensity, is determined and sent with the image data to the CPU for further processing. Such imaging readers, while effective, result in excessive processing operations at the CPU that slow overall operation of the imaging reader. Further still, the CPU may not have sufficient capability to provide real time operations including optimal indicia decoding.

Accordingly, there is a need for a system to decode an image indicia using an improved interface that reduces processing load on a CPU of an imaging reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described herein, the embodiments of the present disclosure are directed to an imaging reader device that includes an imager that be formed of an array of image sensors. The image sensors capture an image of a target over a field of view, from which the image sensors generate image data corresponding to the target. That target may be a package containing a barcode or other scannable indicia. Generally speaking, and by way of example not limitation, a barcode is a coded pattern of graphical indicia that may be formed of a series of bars or squares and spaces of varying widths and lengths, the bars/squares and spaces having differing light reflecting characteristics.

The imaging reader device includes an application specific integrated circuit (ASIC) operatively connected to the imager to receive image data of the target. The imager may be a solid-state imager, for example.

In addition to receiving image data of the target, the ASIC may be further configured to receive capture data, e.g., from other sub-systems of the imaging reader, where that capture data indicates system conditions for capturing the image of the target. Example capture data includes at least one of (1) data specifying an exposure time period for the imager, (2) data specifying a gain for the imager, (3) data specifying a focal length for an imaging lens assembly, (4) data specifying an illumination time period for the illumination light, (5) data specifying an intensity level for an illumination light, (6) data specifying an aiming time period for an aiming light, and (7) data specifying an intensity level for an aiming light.

In some examples, the ASIC is configured to perform preliminary image processing and to decode encoded information on the target, such as barcode data. The ASIC is configured to achieve these functions as a front-end processor of the imaging reader, thereby allowing for real time decoding of encoded information and allowing the ASIC to generate image data embedded with decoded data. The ASIC then sends the resulting decode enhanced image data frame(s) to a system processor where further processing occurs. By providing, at the ASIC, initial image processing, symbol detection and decoding, and by embedding decoded information into an image data frame with image data, the imaging reader is able to more efficiently scan barcodes and provide examinable data on the barcodes, without offloading these processing intensive functions to a system processor, thereby allowing the system processor to control operations of the imaging reader with greater speed and accuracy, improving overall operation of the imaging reader, from scan rates to display of image data.

Figure 1:
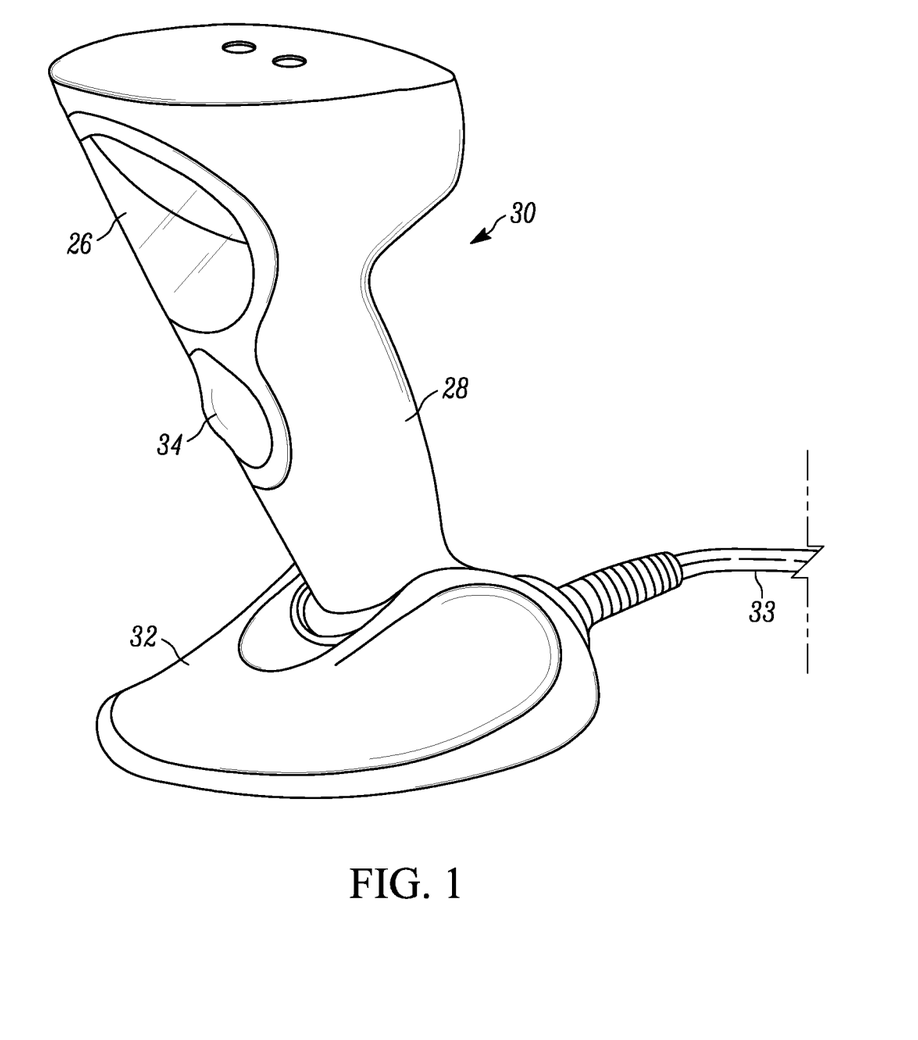
FIG. 1 is a perspective view of a portable imaging reader operative in either a handheld mode, or a hands-free mode, for capturing return light from targets, in accordance with an example.

FIG. 1 illustrates a portable imaging reader 30 that includes a generally upright window 26 and a handle-shaped housing 28 supported by a base 32, for example, for supporting the imaging reader 30 on a flat surface, such as a tabletop. The imaging reader 30 may be operated in handheld mode or in a hands-free mode, e.g., where the imaging reader 30 is positioned on the flat surface and operates as a stationary workstation in which targets are slid, swiped past, or presented to, the window 26. In the handheld mode, the housing 28 may be held in an operator's hand in which the imaging reader 30 is moved, and a trigger 34 is manually depressed by the operator to initiate imaging of targets, especially one- or two-dimensional barcodes, and/or other indicia, located at, or at a distance from, the window 26. In other implementations, the base 32 may be omitted, and housings of other configurations can be employed. The imaging reader 30 is configured to capture image data of a target, in particular image data of encoded barcode or other indicia on the target 38. The capture imaging data may be communicated to connected devices through a wired connection 33, while in other examples, the imaging reader 30 includes a wireless transceiver for communicating image data through a wireless link or wireless network.

Figure 2:
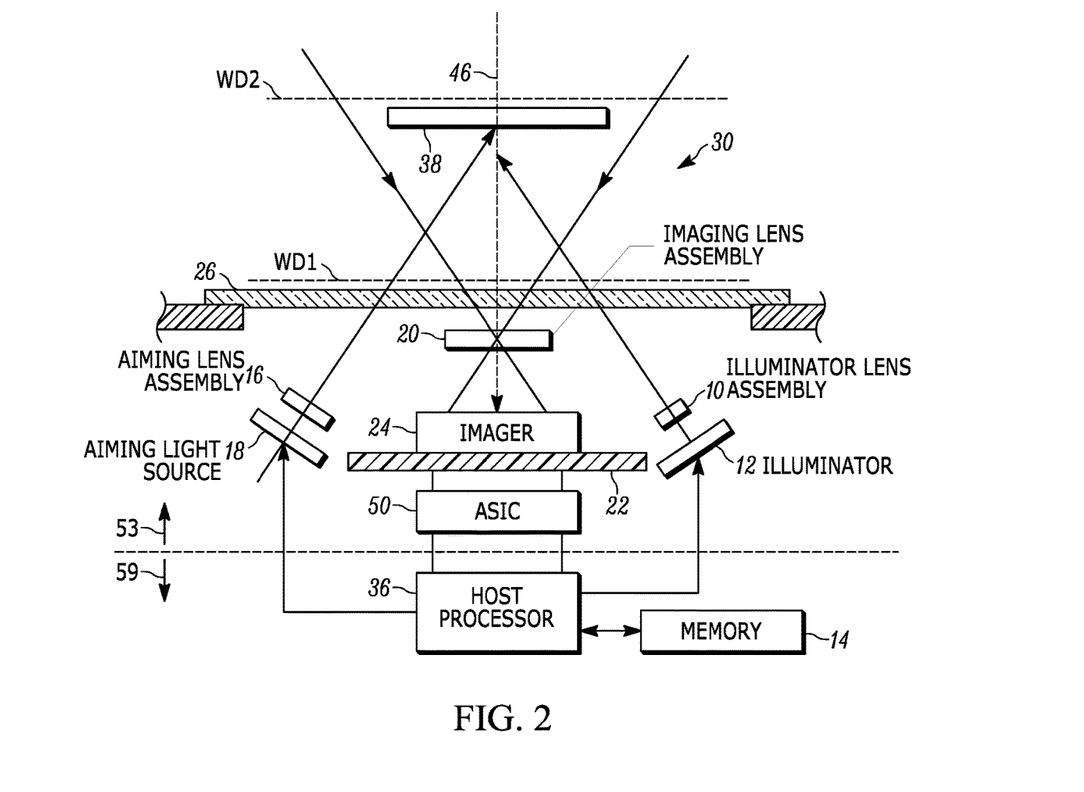
FIG. 2 is a schematic diagram of various components of the portable imaging reader of FIG. 1, in accordance with an example.

As shown in FIG. 2, an imager 24 is mounted on a printed circuit board 22 in the reader. The imager 24 is a solid-state device, for example, a charged coupled device (CCD) image or a complementary metal-oxide-semiconductor (CMOS) imager having a one-dimensional array of addressable image sensors or pixels arranged in a single, linear row, or a two-dimensional array of such sensors arranged in mutually orthogonal rows and columns, and operative for detecting return light captured by an imaging lens assembly 20 along an optical path or axis 46 through the window 26. The return light is scattered and/or reflected from the target 38 as pixel data over a two-dimensional field of view.

The imager 24 may include electrical circuitry having a settable gain for converting the pixel data to analog electrical signals, and a digitizer for digitizing the analog signals to digitized electrical signals or image data. The imaging lens assembly 20 may be operative for adjustably focusing the return light at a settable focal length onto the array of image sensors to enable the target 38 to be read. The target 38 may be located anywhere in a working range of distances between a close-in working distance (WD1) and a far-out working distance (WD2). In a preferred embodiment, WD1 is about four to six inches from the imager 24, and WD2 can be many feet from the window 26, for example, around fifty feet away.

An illuminating assembly is also mounted in the imaging reader 30 and preferably includes an illuminator or illuminating light source 12, e.g., a light emitting diode (LED) or a laser, and an illuminating lens assembly 10 to uniformly illuminate the target 38 with an illuminating light having a settable intensity level over a settable illumination time period. The light source 12 is preferably a pulsed light source.

An aiming assembly is mounted in the imaging reader 30 and, in the illustrated example, includes an aiming light source 18, e.g., an light emitting diode (LED) or a laser, for emitting an aiming light with a settable intensity level over a settable illumination time period, and an aiming lens assembly 16 for generating a visible aiming light pattern from the aiming light on the target 38. The aiming pattern is useful to help the operator accurately aim the reader at the target 38.

As shown in FIG. 2, the illuminating light source 12 and the aiming light source 18 are operatively connected to a controller or host processor 36 (also termed a system processor) operative for controlling operation of components of the imaging reader 30. The imager 24 is operatively connected to the host processor 36 via an application specific integrated circuit (ASIC) 50, where each are separate dedicated processors. In various examples, the ASIC 50 and/or the host processor 36 control the imager 24. A local memory 14 is accessible by the host processor 36 for storing and retrieving data.

In an example, the host processor 36 sends a command signal to energize the aiming light source 18 prior to image capture, and also pulses the illuminating light source 12 for the illumination time period, e.g., at 500 microseconds or less, and energizes and exposes the imager 24 to collect light, e.g., illumination light and/or ambient light, from the target during an exposure time period. In an example, the array of the imager 24 acquires the target images and operates at a frame rate of about 30-60 frames per second.

Figure 3:
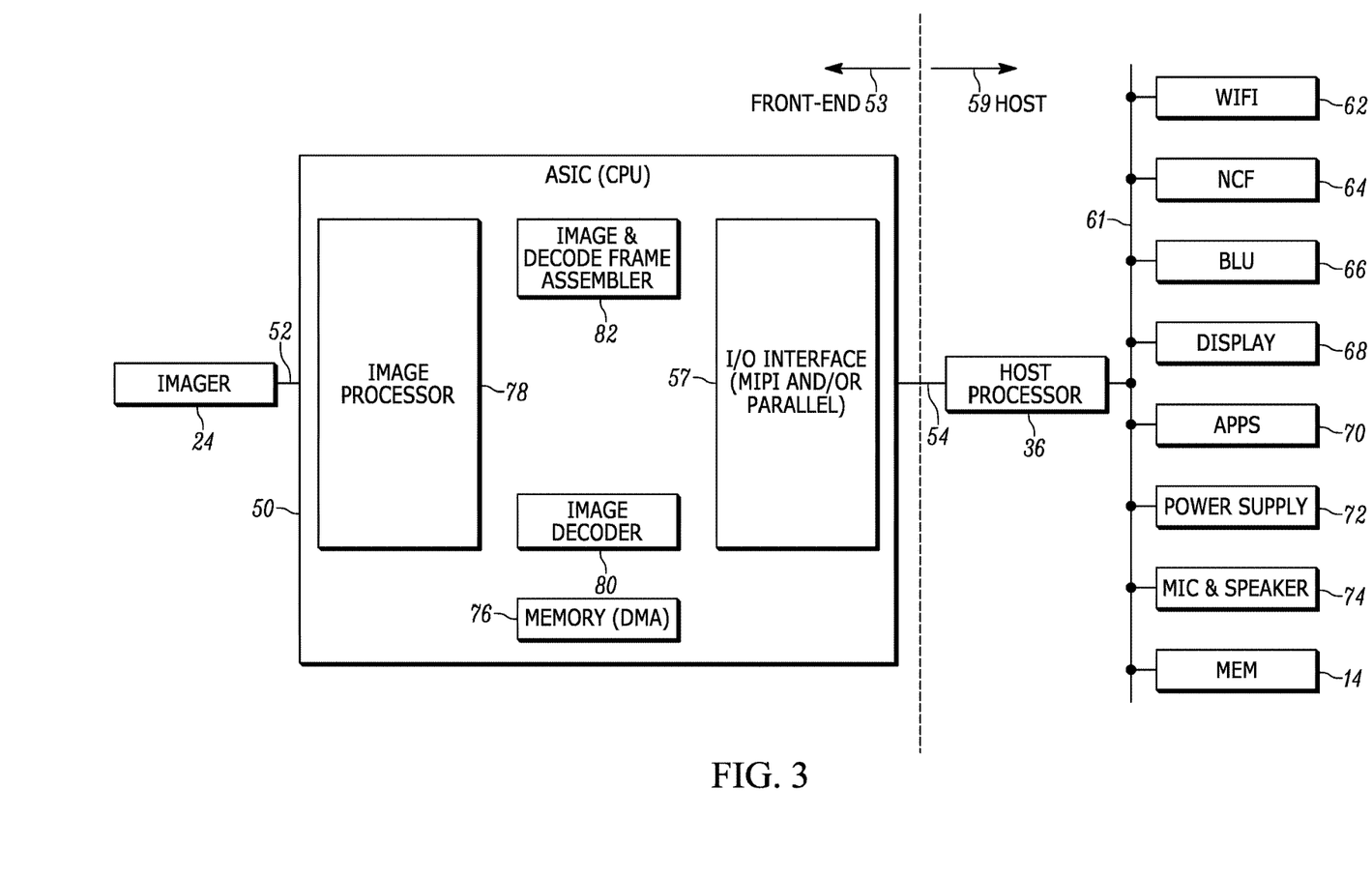
FIG. 3 is a schematic of a dedicated front-end controller on the portable imaging reader configured to decode encoded images captured by the portable imaging reader and communicate with a host side processor, in accordance with an example.

As shown in FIG. 3, in an example, the ASIC 50 is operatively connected to the imager 24 via an image data bus 52 over which the image data is transmitted from the imager 24 to the ASIC 50.

The ASIC 50 is connected to the host processor via a system bus 54 over which capture data for controlling operation of the imaging reader is transmitted and over which image data is transmitted from the ASIC 50 to the host processor 36. In an example, the system bus 54 is an inter-integrated circuit bus, indicated by the acronym I2C.

In the illustrated example, the ASIC 50 is operatively connected to the host processor 36 through an Input/Output interface 57. The ASIC 50 may receive some capture data from the host processor 36, e.g., over the system bus 54 operatively connected to the ASIC 50 via the I/O interface 57, which may be implemented as a mobile industry processor interface (MIPI) I/O interface.

In the illustrated example, processing on the imaging reader 30 is segmented into a front-end processing side 53 and a host processing side 59 each operatively connected to one another through the I/O interface 57. The host processor 36 may transmit capture data and control commands from the host processing side 59 to the front-end processing side 53 through the I/O interface 57, while the ASIC 50 may transmit image data, including as discussed further herein enhanced image data, to the host processor 36 via the I/O interface 57. In an example, the buses 52 and 54 are bi-directional, as well as buss 61 operatively connecting the host processor 36 to various sub-systems of the imaging reader 30, these sub-systems including a WiFi transceiver subsystem 62, an near field communication (NFC) subsystem 64, a Bluetooth sub-system 66, a display 68, series of applications (apps) stored in a app memory sub-system 70, a power supply 72 providing power to the imaging reader 30, and a microphone and speaker sub-system 74.

The capture data received at the ASIC may include, among other things, control settings by which the host processor 36 and/or the ASIC 50 sets one or more of the settable exposure time period for the imager 24, the settable gain for the imager 24, the settable focal length for the imaging lens assembly 20, the settable illumination time period for the illumination light, the settable intensity level for the illumination light, the settable aiming time period for the aiming light, the settable intensity level for the aiming light, as well as myriad other system functions, such as decode restrictions, de-skewing parameters, re-sampling parameters, enhancing parameters, data compression parameters, and how often and when to transmit the processed image away from the host processor 36, and so on.

In some examples, the ASIC 50 combines the image data with one or more of the capture data to form a combined image data embedded with the capture data. The ASIC 50 may be configured to automatically combine capture data, in some examples. While in other examples, the ASIC 50 may combine capture data in a prioritized manner or otherwise programmed manner. For example, the ASIC 50 may have stored in a memory 76 a prioritization of capture data and a data limit that indicates the amount of capture data that may be combined with the image data. As the ASIC 50 receives the capture data, the ASIC 50 may determine the priority of the received data and then only combine with the image the higher priority capture data, until a total allotted data amount is satisfied.

The ASIC 50 includes an image processor 78 for processing image data. That processing includes identifying indicia in the captured image data of the target 38, including identifying one or more barcodes representing encoded indicia. In an example, the barcodes may be one-dimensional or two-dimensional barcodes and may include QR code symbols, etc. The image processor 78 may perform pixel and image smoothing as the image data is received. Additional processing includes statistical analysis on blocks of image data, from which the image processor 78 performs edge detection identifying symbols in the image data, including the bounds of the symbol and the resolution of the symbol for sufficiently accurate identification of the symbol and sufficiently accurate decoding of the symbol.

To decode symbols in the image data, the ASIC 50 includes an image decoder 80. The image decoder 80 is configured to decode the identified indicia in the image data, whether those symbols are 1D or 2D barcodes, QR codes, linear barcodes, or other encoded indicia. At the image decoder 80, the ASIC 50 decodes the one or more encoded indicia and generates decode data corresponding to the one or more indicia. The decode data may represent the decoded information encoded in one or more barcodes on the target 38, for example. The image decoder 80 transmits the decode data to an image and decode frame assembler 82 that is configured to combine the image data and the decode data into a decode enhanced image frame, which the ASIC 50 may then send to the host processor 36 through the I/O interface 57.

In some examples, the image data received at the image processor 78 is raw image data from the image sensor 24 and that raw image data is transmitted to the image decoder 80 which is configured to decode symbols from this raw image data. The image and decode frame assembly 82 then combines the raw image data with the decode data to form the decode enhanced image frame. In this way, preliminary image processing such as image/pixel smoothing, signal-to-noise ratio processing, image contrast processing, etc. may be avoided and the raw image data may be decoded and combined into the enhanced image frame more quickly, with less processing intensive operations at the ASIC 50.

In some examples, the raw image data from the image sensor 24 is converted to a rendition of the raw image data before combining, and then the rendition of the raw image data is configured with the decode data to form the decode enhanced image frame. In some examples, these renditions may be reduced resolution renditions of the original raw image data received from the image sensor 24. Reduced resolution renditions of an image may be useful to allow for quick display of image data to an operator using the display 68 on the imaging reader 30 or some other display, where high image resolution is not necessary.

By having the ASIC 50 entirely on the front-end processing side 53, much faster processing of the image data, decoding of symbols, and embedding of decode data and image data may be performed. By further configuring the ASIC 50 to produce renditions of that image data, including for example from the raw image data, such decoding and embedding processing may be increased even further. The result, in some implementations, is that the display 68 of the imaging reader 30 may display a rendition of the image data to a user along with decode data that the host processor 36 has assessed to determine and display the underlying product data associated with that decode data. The operator may then quickly assess, at the imaging reader 30, what image data has been captured, what barcode has been captured, and product data associated with that barcode, from which the operator can quickly assess with the scan of the image reader 30 was accurate.

In an example, the image and decode frame assembler 82 is configured to determine a combination protocol for forming the decode enhanced image frame. The combination protocol determines how the decode data will be combined with the image data. Example combination protocols include combination protocols instructing that the decode data be appended as an additional data row or data rows to be added to the image data to form a decode enhanced image data frame. Other combination protocols include instructions that the decode data be appended as an additional data column or columns to the image data in forming a decode enhanced image data frame. Other combination protocols include instructions that the decode data replace a portion of the image data frame, for example, such that decode data is stored fully embedded with image data to form the decode enhanced image frame.

Figure 4:
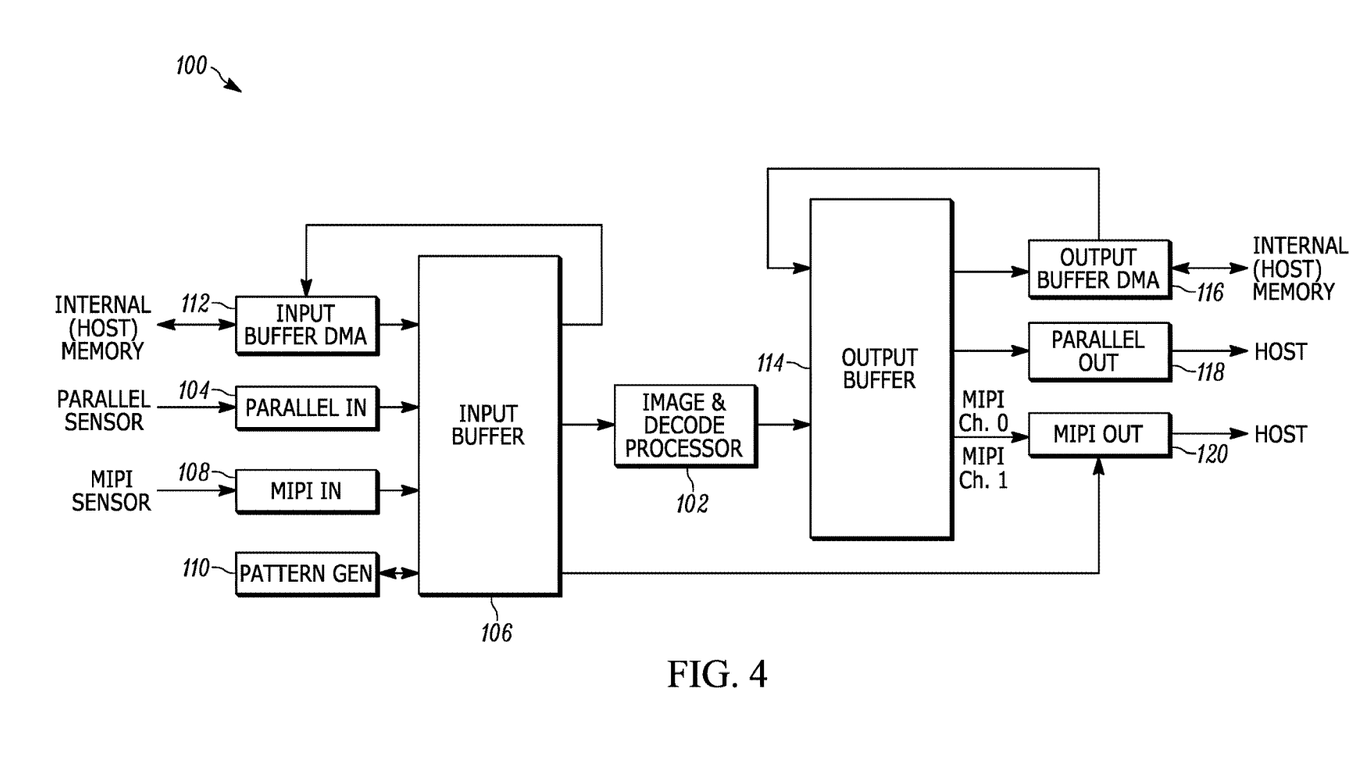
FIG. 4 is a schematic of a dedicated controller on the portable imaging reader configured to preform image processing to decode encoded images, in accordance with an example.

FIG. 4 illustrates an example architecture 100 for the ASIC 50. Operation of the image processor 78, image decode 80, and image and decode frame assembler 82 is configured as an image and decode processor 102. Image data from the imager 24 is received as a parallel image data stream of the image sensors forming the imager through a parallel input stage 104 feeding an input buffer 106 operatively connected to the image and decode processor 102. In the illustrated example, capture data is received from one or more MIPI sensors or a MIPI data source, on the front-end side of the imaging reader, on a host side of the imaging reader, or on a combination of both. The MIPI capture data is received, either in a serial manner or in a parallel manner, at a MIPI input stage 108 and provided to the input buffer 106.

A pattern generator stage 110 is also operatively connected to the input buffer and stores data for identifying indicia, such as 2D barcodes in capture image data and for decoding encoded data in that indicia.

The input buffer 106 is coupled to an input memory (DMA) 112 of the ASIC, where that input memory 112 may be operatively coupled to an internal memory of the host processing side of the imaging reader.

The image and decode processor produces decode enhanced image data frames in accordance with the techniques herein and sends those image frames to an output buffer 114, which is operatively connected to an output buffer memory (DMA) 116. The decode enhanced image data frames are communicated to a parallel output stage 118, while capture data may be communicated to a MIPI output stage 120. The input stages 104 and 106 and the output stages 118 and 120 may be implemented by the I/O interface 57, in an example. The I/O interface 57 may include dedicated internal buffers, which would typically be smaller than the output buffer 114 and the input buffer 106.

Figure 5:
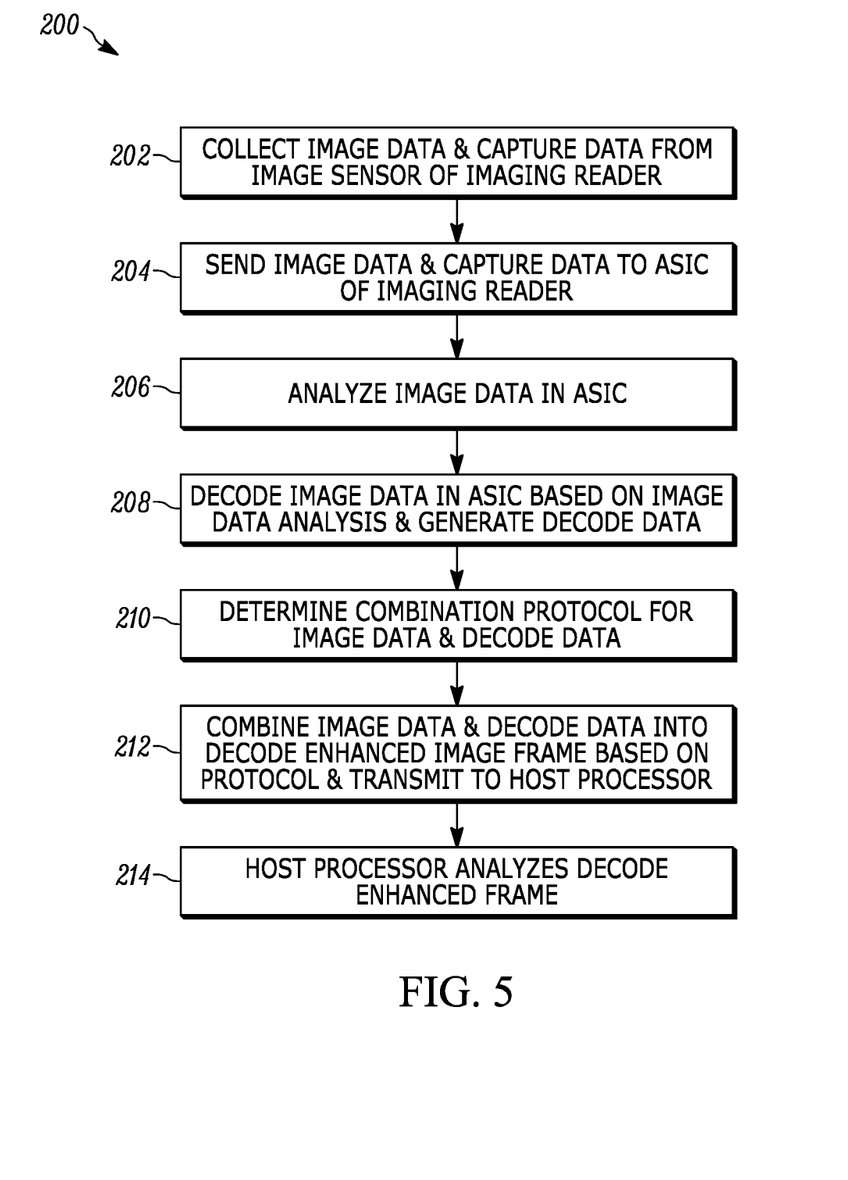
FIG. 5 is a flow chart of a method for decoding images using the dedicated controller of the portable imaging reader, in accordance with an example.

FIG. 5 illustrates an example operation 200 for imaging a target using an imaging reader, such as the imaging reader 30. At an operation 202, an imaging sensor captures image data. An imaging sensor may capture the image data continuously in response to triggering of the imaging reader, or a single frame of image data may be captured in response to a trigger.

Additionally, capture data corresponding to one or more operating conditions of the imaging sensor and/or of imaging reader is obtained and stored in association with the captured image data, for example in time stamped manner. The capture data may be collected directly by an ASIC in a front-end processing side of the imaging reader, while in some examples, capture data may be received from a host processor on a host processing side of the imaging reader and collected at the ASIC.

At an operation 204, the captured mage data and the capture data are received at the ASIC of the imaging reader, such as the ASIC 50. At an operation 206, the ASIC analyzes the image data, including identifying encoded indicia such as barcodes within the captured image data. At the operation 204, the ASIC may analyze raw captured image data, while in other examples, the ASIC may perform preliminary image processing on the captured image data, such as image smoothing, contrast adjustments, increasing signal-to-noise ratios in the image data, etc.

The processed image data identifying one or more symbols in the captured image data is sent to an image decoder of the ASIC, which at an operation 208 decodes the one or more symbols and generates decode data for each of the decoded indicia. The image decoder may access stored barcode pattern data stored in a memory of the ASIC, where that pattern data may include data for decoding 1D or 2D barcodes, QR codes, or other encoded indicia, for example.

At an operation 210, an image and decode frame assembler of the ASIC receives the decode data from the image decoder, analyzes that decode data, and determines a combination protocol. That determination may be based on an analysis of the data size of the decode data. That determination may be based on an analysis of the size of the image data and a comparison to the data size of the decode data. That determination may be based on a size of the capture data. That determination may be based on any combination of the size of the captured image data, the size of the capture data, and the size of the decode data. The determination at the operation 210 may be preconfigured, for example, set by the host processor. The host processor may be configured to analyze embedded decode data in a particular location in a received image data frame, and, as such, the host processor may communicate that desired protocol to an image and decode frame assembler to use. In some examples, the ASIC may enter an initialization mode upon initial startup to poll the host processor for a default combination protocol. The ASIC may use that default combination protocol at all times, in some examples, while in other examples, the ASIC may change to a different combination protocol in response to the determination performed at the operation 210.

FIGS. 6A-6D illustrated different combination protocols that result from a process 212 combining the image data and the decode data into a decode enhanced image frame.

Figure 6A:
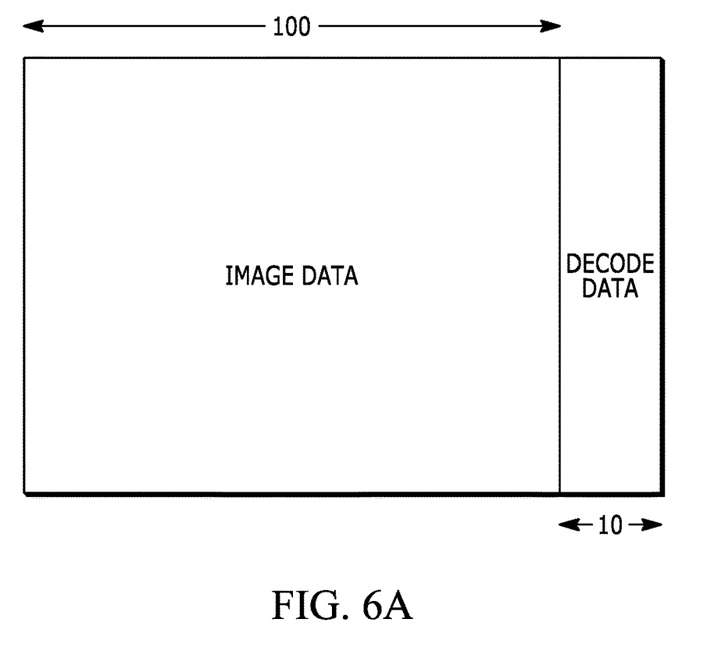
FIGS. 6A-6D illustrate example decode enhanced image data frames produced by the operations of FIG. 5, in accordance with an example.

In FIG. 6A, the image and decode frame assembler produces an image frame having image data in a first portion and decode data stored in appended columns to form the decode enhanced image frame. While not shown, in some examples, the image data includes combined capture data. In some examples, the decode data may include the capture data. In some examples, the capture data may be excluded. In some examples, the capture data may be stored in another dedicated portion of the image frame (nor shown). In the illustrated example, the decode enhanced image data frame contains 100 columns of image data an additional appended 10 columns of decode data.

Figure 6B:
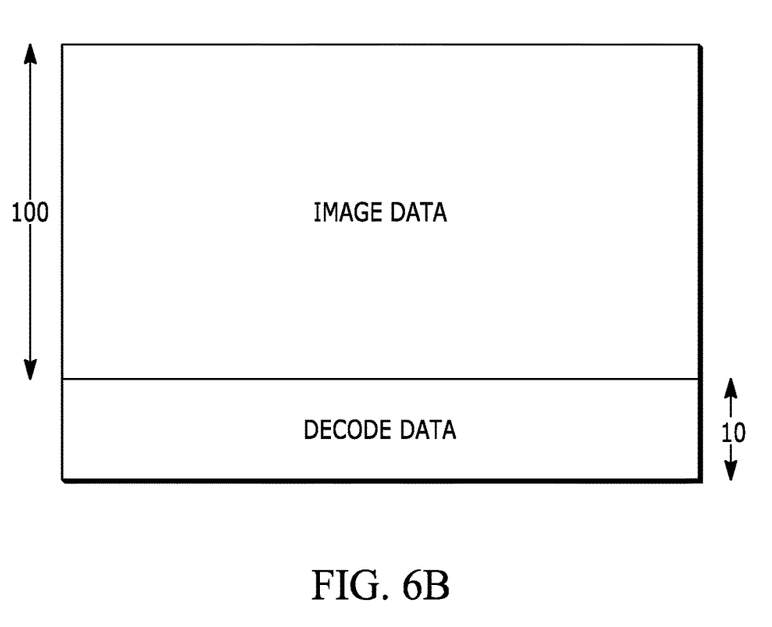

FIG. 6B illustrates another decode enhanced image frame in which the decode data is stored in rows appended to the image data to form the decode enhanced image data frame. Image data is contained in 100 rows of the image data frame, and the decode data is stored in 10 additional rows appended to that image data.

The decode data may be identified to the host CPU based on dedicated columns or rows, in these examples.

Figure 6C:
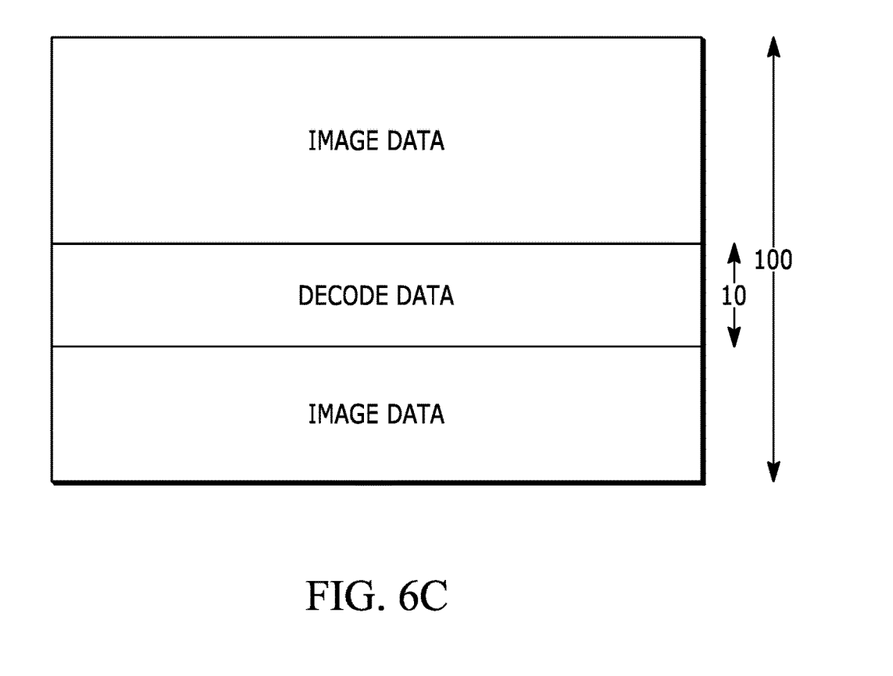

FIG. 6C illustrates a decode enhanced image frame in which the decode data is stored in intermediate rows of the image frame, with image data stored in rows preceding and other rows following the decode data. In the illustrated example, 10 rows of the 100 rows allotted for image data have been used to embed decode data. That is, for the combination protocol resulting in the image frame of FIG. 6C, the image and decode frame assembler may replace a portion the image data with the decode data, such as a portion of the image data not containing an indicia. An advantage of the image frame of FIG. 6C is that by embedding decode data within the image data, a smaller sized image frame may be used (e.g., 100 columns by 100 rows in the illustrated example.

Figure 6D:
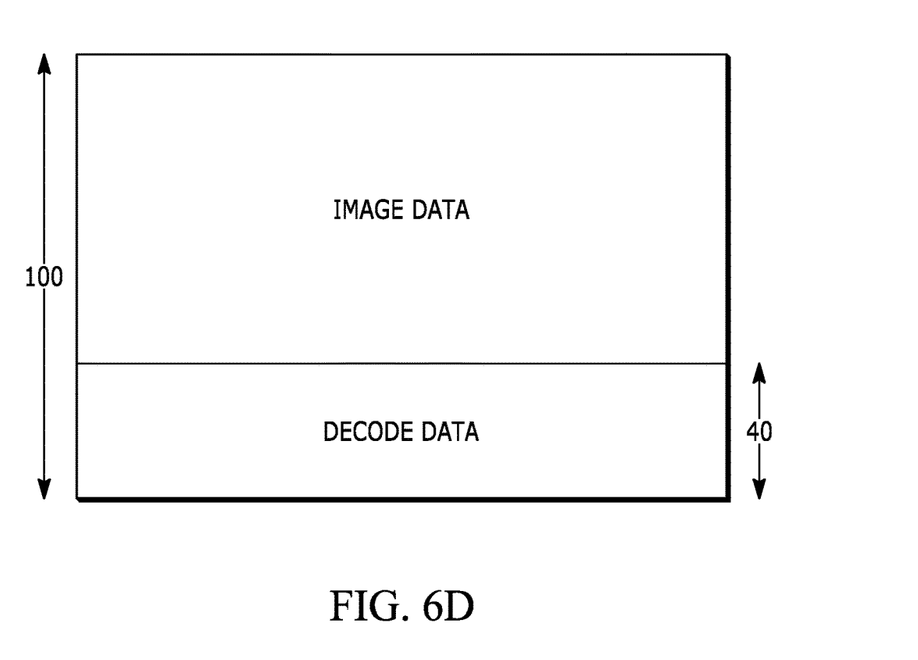

FIG. 6D illustrates another decode enhanced image frame, in which the decode data replaces the lower row portions of the image frame, which can likewise result in an image data frame smaller in size than the appended decode data protocols corresponding to the FIGS. 6A and 6B.

In some examples, the combination protocol replaces image data (e.g., pixels) in a contiguous manner. For example, FIG. 6C shows the embedded decode data over a contiguous block of rows. In other examples, the combination protocol instructs to embedded the decode data throughout the image data in a non-contiguous or partially contiguous manner. For example, the combination protocol may instruct to embed decode data at any low order bit pixel within the image data. Example low order bit pixels include non-information carrying pixels. By interspersing the decode data in this manner, the image data will still be recognizable, but the combination protocol has taken advantage of the low intensity noise in the pixels. For example, the system may use the combination protocol for images with an intensity noise below a threshold amount, such that interspersing decode data throughout the image data pixels (i.e., without requiring contiguous embedded) will not adversely degrade image data quality and analysis at the host CPU.

At the operation 212, the ASIC sends the decode enhanced image frame to the host processor. At an operation 214, the host processor analyzes the received data for further processing.

While various examples here are described in reference to an ASIC as the front-end processor, it will be appreciated that any dedicated front-end processor may be used. An example includes a dedicated decode CPU and memory communicatively coupled to a host processor through an I/O interface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An imaging reader comprising:
    a solid-state imager configured to capture return an image of a target over a field of view and configured to generate image data corresponding to the target;
    an application specific integrated circuit (ASIC) operatively connected to the solid-state imager to receive the image data of the target from the solid-state imager and to receive capture data indicating system conditions for capturing the image of the target;
    the ASIC being configured to analyze the image data and decode an indicia on the target located in the image and to generate decode data corresponding to the indicia;
    the ASIC being further configured to combine the image data and the decode data into a decode enhanced image frame; and
    the ASIC being further configured to send the decode enhanced image frame in one frame to a host processor operatively connected to the ASIC and configured to process the decode enhanced image frame from the ASIC.

2. The imaging reader of claim 1, wherein the image data is raw image data from the image sensor, such that the ASIC is configured to combine the raw image data with the decode data to form the decode enhanced image frame.

3. The imaging reader of claim 1, wherein the image data is raw image data from the image sensor, and wherein the ASIC is configured to convert the raw image data to a rendition of the raw image data before combining, as the image data, the rendition of the raw image data with the decode data to form the decode enhanced image frame.

4. The imaging reader of claim 1, further comprising the ASIC being configured to determine, from analysis of the image data, a combination protocol, and wherein the ASIC is configured to combine the image data and the decode data into the decode enhanced image frame, based on the combination protocol.

5. The imaging reader of claim 1, wherein the combination protocol instructs that the decode data is appended as additional data row or rows to the image data.

6. The imaging reader of claim 1, wherein the combination protocol instructs that the decode data is appended as additional data column or columns to the image data.

7. The imaging reader of claim 4, wherein the combination protocol instructs that the decode data replaces a portion of the image data.

8. The imaging reader of claim 4, wherein the combination protocol instructs that the decode data replaces low order bits of the image data.

9. The imaging reader of claim 4, wherein the combination protocol instructs that the decode data in a contiguous manner.

10. The imaging reader of claim 4, wherein the combination protocol instructs that the decode data in a non-contiguous manner.

11. The imaging reader of claim 1, wherein the ASIC is further configured to combine the capture data with the image data and the decode data to form the decode enhanced image frame, where the capture data includes at least one of (1) data specifying an exposure time period for the imager, (2) data specifying a gain for the imager, (3) data specifying a focal length for an imaging lens assembly, (4) data specifying an illumination time period for the illumination light, (5) data specifying an intensity level for an illumination light, (6) data specifying an aiming time period for an aiming light, and (7) data specifying an intensity level for an aiming light.

12. The imaging reader of claim 1, wherein the solid-state imager and the ASIC are contained on one or more Mobile Industry Processor Interface (MIPI) compliant circuit boards.

13. A method for imaging a target with an imaging reader, the method comprising:
    capturing, in a solid-state imager, an image of the target over a field of view and generating image data corresponding to the target;
    receiving, at an application specific integrated circuit (ASIC) operatively connected to the solid-state imager, the image data of the target and capture data indicating system conditions for capturing the image of the target,
    analyzing, at the ASIC, the image data, decoding indicia on the target located in the image, and generating decode data corresponding to the indicia;
    combining, at the ASIC, the image data and the decode data into a decode enhanced image frame; and
    sending, via the ASIC, the decode enhanced image frame in one frame to a host processor operatively connected to the ASIC, the host processor being configured to process the decode enhanced image frame from the ASIC.

* * * * *